TRUNK CIRCUIT FOR ATTENDANT'S CABINET

Filed Dec. 1, 1955 6 Sheets-Sheet 1

INVENTOR.
WILLIAM W. PHARIS
BY [signature]
ATTORNEY

July 1, 1958 W. W. PHARIS 2,841,653

TRUNK CIRCUIT FOR ATTENDANT'S CABINET

Filed Dec. 1, 1955 6 Sheets-Sheet 4

July 1, 1958 W. W. PHARIS 2,841,653

TRUNK CIRCUIT FOR ATTENDANT'S CABINET

Filed Dec. 1, 1955 6 Sheets-Sheet 6

United States Patent Office 2,841,653

Patented July 1, 1958

2,841,653

TRUNK CIRCUIT FOR ATTENDANT'S CABINET

William W. Pharis, Rochester, N. Y., assignor to General Dynamics Corporation, a corporation of Delaware Application December 1, 1955, Serial No. 550,245

4 Claims. (Cl. 179—27)

This invention relates to trunk circuits and more particularly to trunk circuits for attendant's cabinets.

Usually, an attendant's cabinet gives service to small private branch exchanges (P. B. X) which cannot afford the services of a full time operator. Usually a typist or receptionist doubles as an attendant to answer and extend calls. The attendant's cabinet is a very basic switching device which is held to a minimum cost. It does not have many features which may be found in the more complete switchboard which usually is associated with an operator's position. For this reason, the trunk circuit must contain means for complementing the attendant's cabinet, if the cabinet is more nearly to duplicate a switchboard and its functions. This introduces problems of cost since there is only one cabinet and many trunk circuits. Therefore, the cost of each item introduced into the trunk circuit must be multiplied by the number of trunk circuits to determine whether it is economically feasible. Obviously, an extremely simple trunk circuit which may perform additional services is highly desirable.

For example, in the past, the attendant has not been provided with any means for distinguishing between flashing recall which is extended from a local subscriber station and flashing recall which is extended from an operator's position. It would be desirable to provide this feature.

In a similar manner, anything which can be done to reduce the cost of the trunk circuit is equally desirable. For example, in the past, private branch exchanges (P. B. X) have been adapted to provide night service by extending calls through an incoming trunk circuit to a particular telephone station. This telephone station may be located at any convenient place; for example, it may be on the desk of a night watchman. When calls are incoming to the P. B. X, suitable ringing current is transmitted to ring a bell at this station and the watchman is summoned to answer the call. It has been necessary either to run ringing current generating interrupter equipment all night or else to start the interrupter everytime that an incoming call is received. It would save considerable wear and tear on the interrupter and simplify the equipment if it does not have to furnish ringing current everytime that a call is received during periods of night service. Furthermore, if there is a power failure at the P. B. X, the distant exchange may furnish both ringing current and talking battery to the P. B. X thereby reducing the current drain on the P. B. X emergency service batteries. The term "night service" is used hereinafter to describe both "night service" in the traditional sense and emergency service during power failure.

An object of this invention is to provide a new and improved trunk circuit for an attendant's cabinet.

Another object of this invention is to provide means for transmitting ringing current to a P. B. X subscriber from a distant office.

It is thought that these and other objects will be obvious from a description of the attached drawings in which.

The source of potential is shown in the attached drawings by means of simple plus (+) and minus (−) signs. As is the case in most telephone systems, the positive terminal is described as being connected with ground, hence, the terms "(−) battery" and "ground (+)." It should be understood that this or any other suitable source may be used.

BRIEF DESCRIPTION

Figure 1:
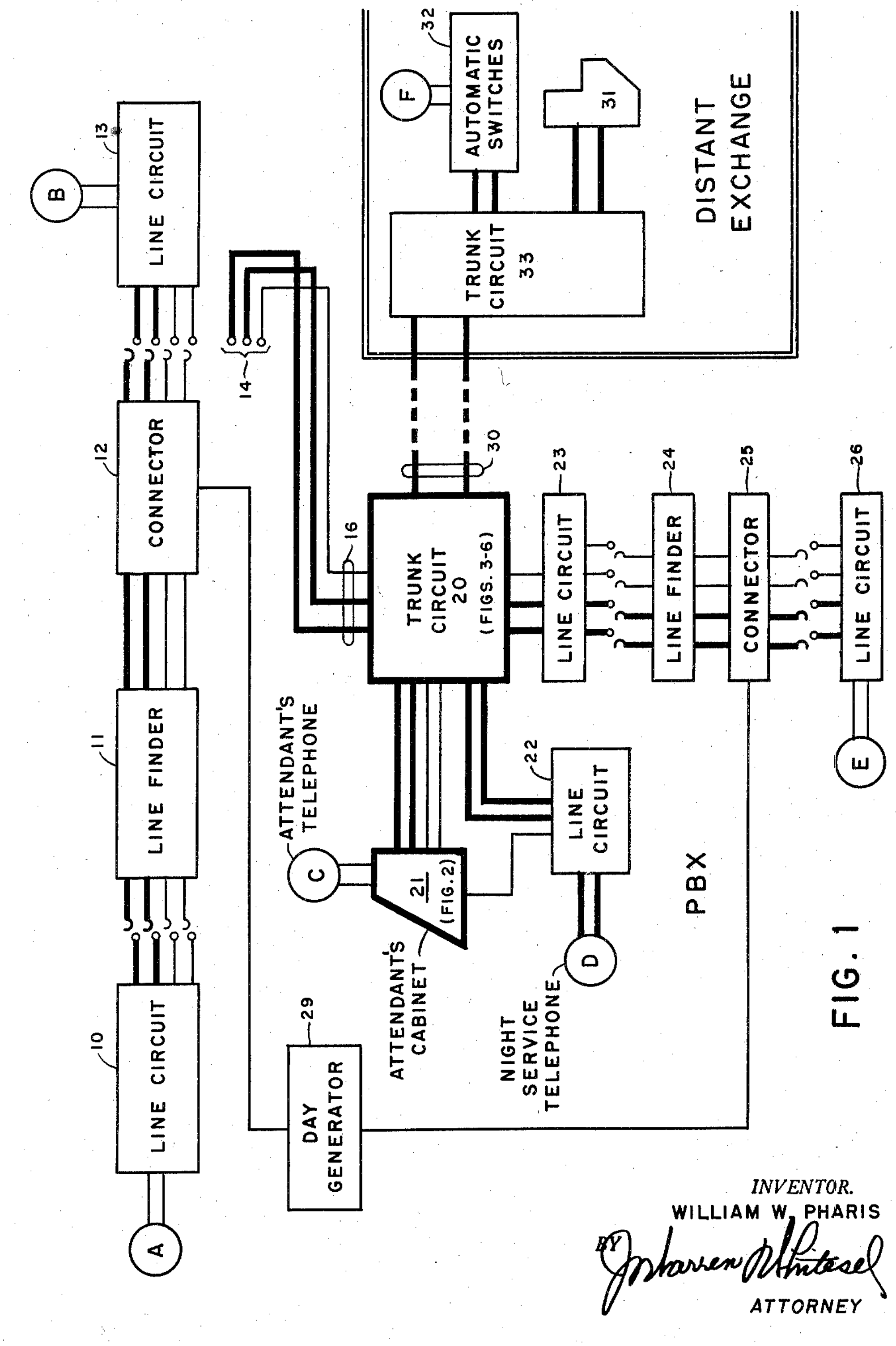
Fig. 1 shows by block diagram a telephone system adapted to use the features of the invention.

Fig. 1 shows a telephone system adapted to utilize the invention. In this system, a P. B. X is given service from a distant exchange over conductors 30. Conductors 30 are also shown in the righthand portion of Fig. 6. Incoming calls may be extended from operator position 31, over trunk circuit 33, conductors 30 and trunk circuit 20 to the attendant's cabinet 21. The attendant answers the call, determines who the called party is and seizes the line circuit 23. Then, the call is completed under control of the attendant over line circuit 23, line finder 24, connector 25 and line circuit 26 to subscriber E, assuming that he is the called subscriber. In this case ringing current comes from day generator 29.

Outgoing calls may be placed by a local subscriber served by line A. These calls are extended through line circuit 10, line finder 11, connector 12, terminals 14, conductors 16, trunk circuit 20, trunk line 30, trunk circuit 33 and automatic switches 32. Conductors 16 are also shown in the upper lefthand portion of Fig. 2. Or, if a local subscriber is called, line circuit 13 may be seized from connector 12 to extend the call to subscriber B. In this case ringing current is also furnished by day generator 29.

Figure 3:
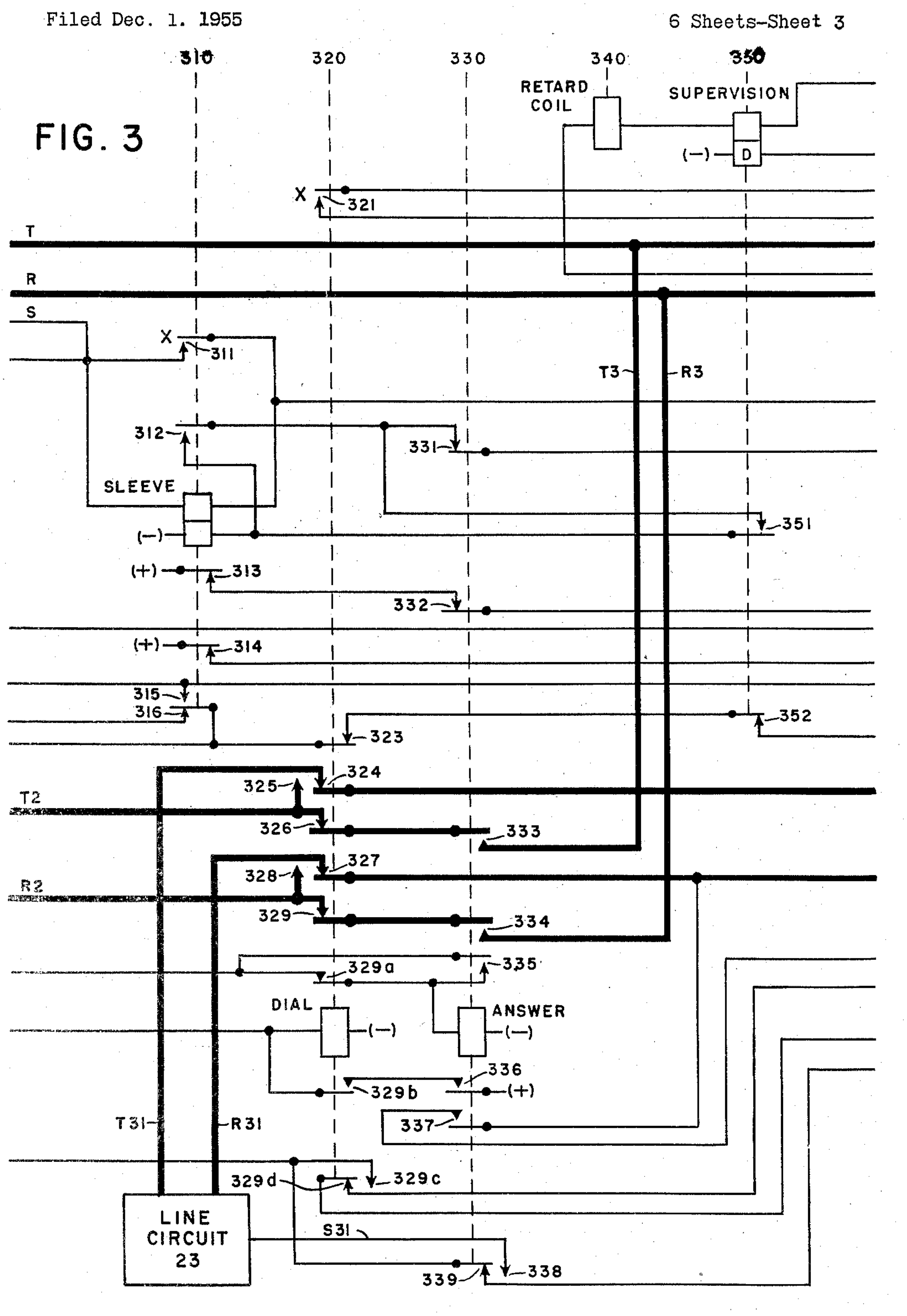
Figs. 3–6 show details of trunk circuit 20.
Figure 4:
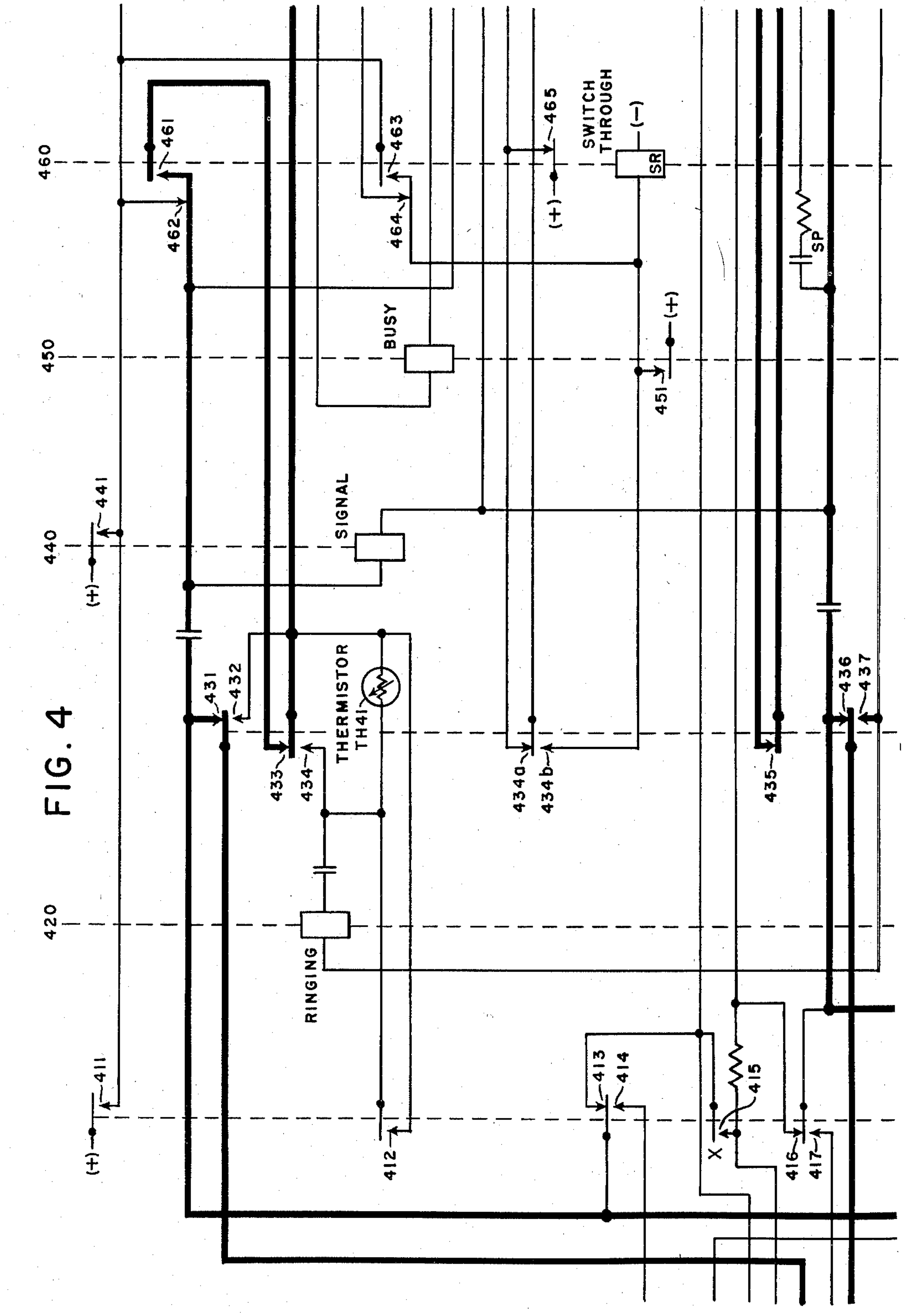
Figures 5, 7:
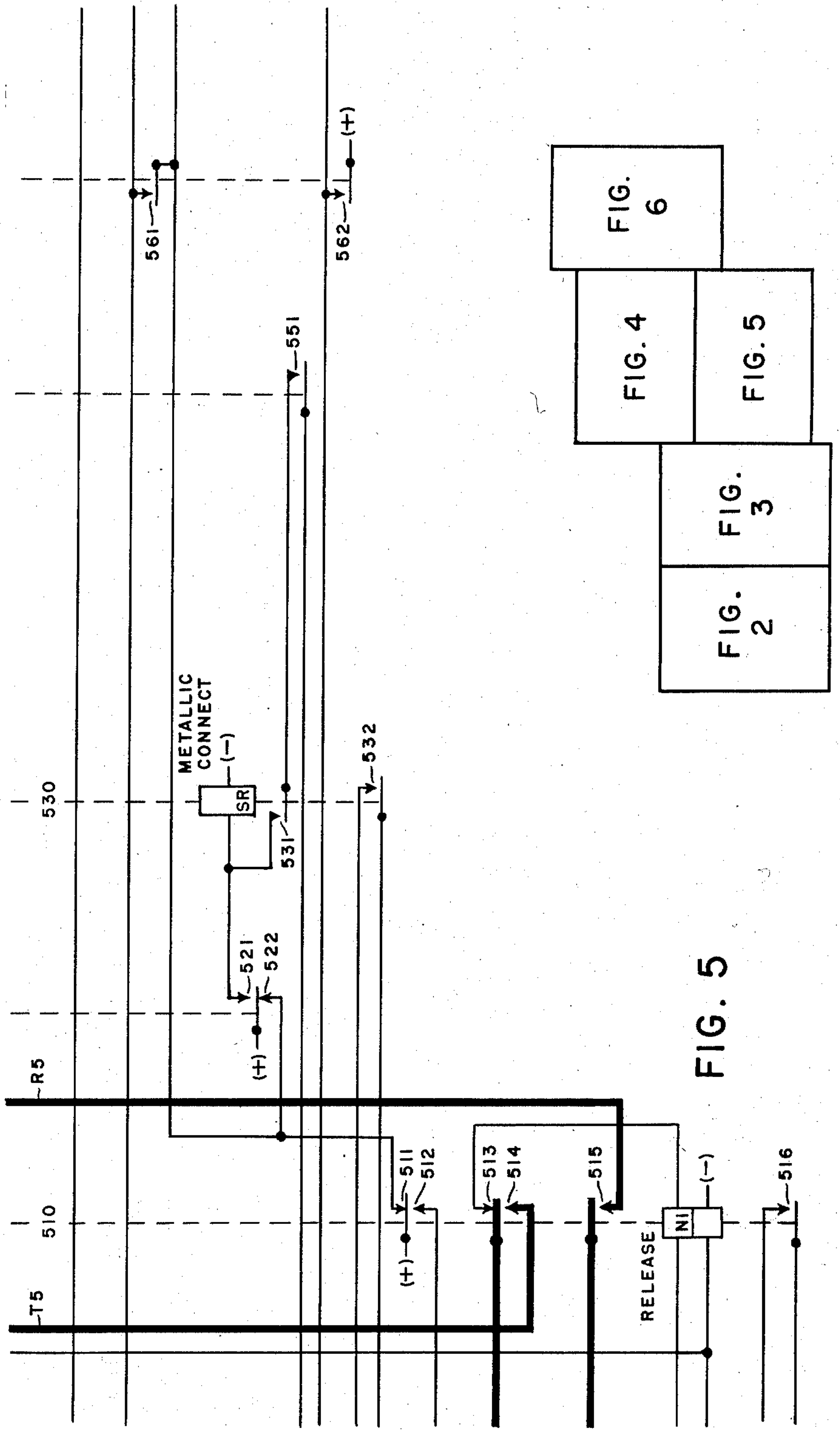
Fig. 7 shows the manner in which to join Figs. 2–6 to provide a complete and understandable circuit.

Flashing recall is distinctive in that, if it is extended from a local subscriber, sleeve relay 310 (Fig. 3) is in a locked position and a brightly lit supervision lamp L23 and incoming lamp L22 are flashing in synchronism with hookswitch jiggles. On the other hand, if recall is from a distant operator, relay 310 is released so that only incoming lamp L22 is flashing but supervision lamp L23 is glowing dimly and is not flashing. Relay 210 and its associated buzzer is an audible signal which duplicates lamp L22 so that the attendant may go about her other business and not have to watch for lamps all of the time.

When night service features are provided, a suitable night service key in attendant's cabinet 21 is operated thereby extending all incoming calls to subscriber station D which may be a telephone on the desk of a night watchman, for example. Outgoing calls may also be extended from this telephone to trunk circuit 20, conductors 30 and trunk circuit 33 to automatic switches 32. Trunk circuit 20 is arranged with a direct metallic talking circuit during periods of night service so that ringing current may be projected directly from the distant office to the telephone at substation D. This circuit is completed at contacts 432 and 437. This avoids the necessity of running day generator 29 to generate ringing current at the P. B. X during night service operation and during periods of power failure at the P. B. X. Talking battery is also furnished from the distant office during periods of night service further to reduce the drain of current required at the P. B. X.

*Incoming call*

Figure 6:
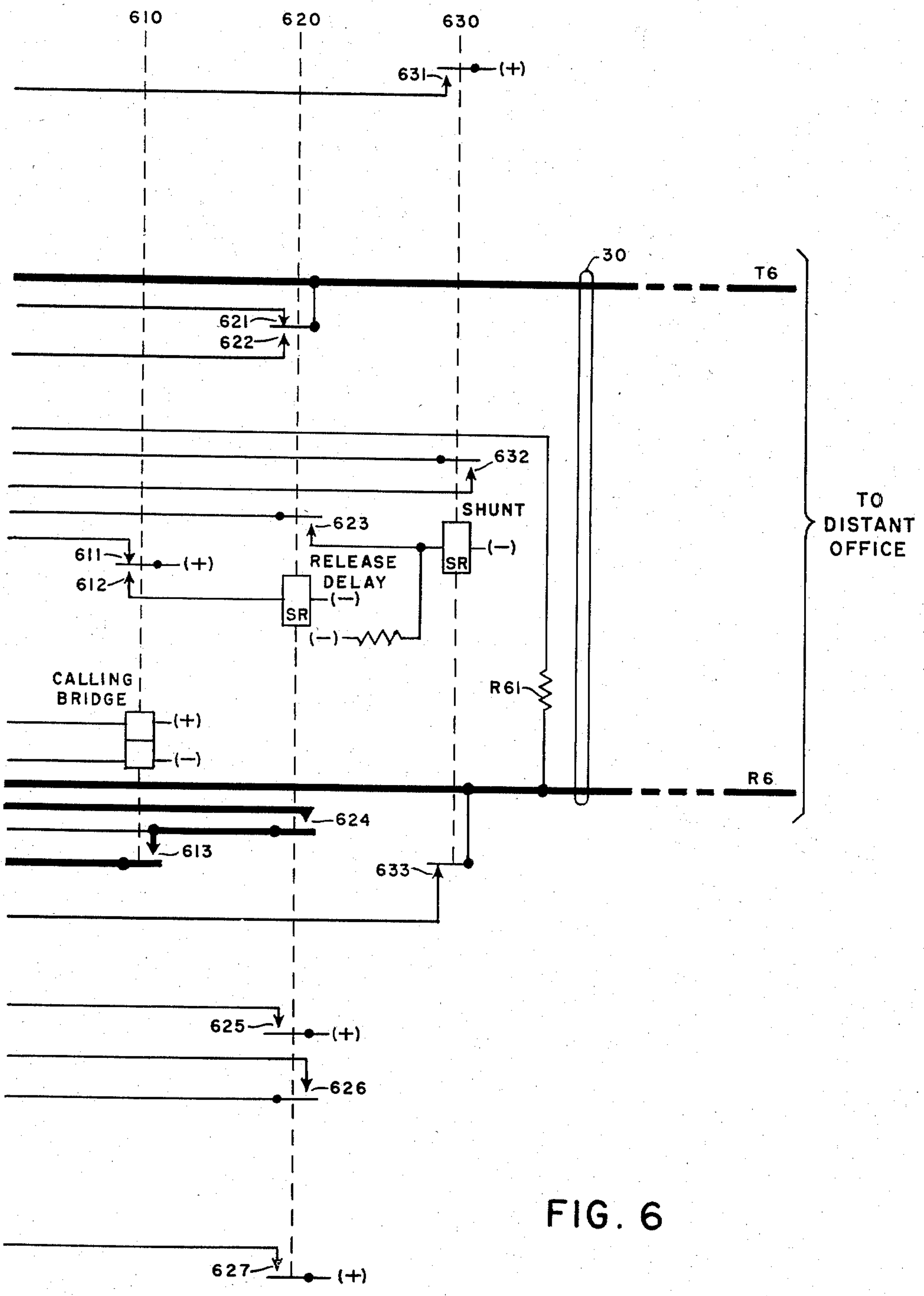

*Seizure.*—The first call to be described is an incoming call which may be extended to the P. B. X from the distant office over trunk line 30. In the normal idle condition, equipment in the distant exchange places (—) battery on conductor R6 (Fig. 6). The tip side is open. When the call is placed, any suitable equipment (not shown) in the distant office may be used to connect a ground (+) marking to tip conductor T6 of trunk 30. Responsive thereto, a circuit is completed for operating busy relay 450. The reason for operating this relay at this time is to seize the P. B. X equipment. The circuit for operating relay 450 may be traced from tip conductor T6 through rest contacts 621, the winding of busy relay 450, and resistor R61 to ring conductor R6.

Busy relay 450 operates and contacts 451 close thereby completing an obvious circuit for operating switch-through relay 460. Contacts 551 prepare a locking path for metallic connect relay 530.

Relay 460 operates to signal the attendant. Contacts 562 close to extend a circuit for lighting busy lamp L21. This circuit may be traced from contacts 562 through contacts NSK3 and the filament of busy lamp L21 to (—) battery. A circuit is also completed for lighting supervisory lamp L23 dimly via (—) battery, the filament of lamp L23, contacts 316, resistor R24, key NSK3 and contacts 562 to ground (+). The lamp is dim because the circuit includes resistor R24. Contacts 561 have no function at this time. Contacts 465 have no function during incoming calls. Contacts 463 close to prepare a locking circuit for switchthrough relay 460. Contacts 461 close to complete one point in the talking circuit.

*Signal.*—The operator at the distant office transmits ringing current over conductors T6 and R6 by any suitable means. A circuit is now completed from tip conductor T6 through thermistor TH41, the winding of ringing relay 420, rest contacts 633 and conductor R6 to the distant office. Ringing relay 420 operates to extend an incoming signal to summon the attendant. Contacts 521 close to operate relay 530 over an obvious circuit. Relay 530 closes its contacts 531 thereby completing a locking circuit for itself from (—) battery extended through its winding, contacts 531, 551, 332 and 313 to ground (+). Contacts 532 close to light incoming lamp L22 as an indication that the call is awaiting answer. Relay 210 operates in series with the lamp to close contacts 211 thereby sounding an audible, buzzer alarm. The remaining contacts on relay 530 are not important at this time.

It might be noted that busy and incoming lamps L21 and L22 are lit brightly, that supervisory lamp L23 is lit dimly, and that the buzzer is sounding. This is the signal of an unanswered incoming call.

*Attendant answers.*—Nothing further happens until the operator at the attendant's cabinet responds to the signals by operating trunk answer key TA21. Responsive thereto, a circuit is completed for operating answer relay 330. This circuit may be traced from (—) battery extended through the winding of relay 330, rest contacts 329*a*, operated contacts of trunk answer key TA21, rest contacts K24 and rest contacts K26 to ground (+). Contacts 331 have no function at this time. Contacts 332 open to release metallic connect relay 530. It might be recalled that it was holding over contacts 531, 551, 332 and 313 to ground (+). Contacts 333 and 334 close to complete one portion of the talking circuit. Contacts 335 close to lock answer relay 330 in an operated condition without dependence upon dial relay contacts 329*a*. Contacts 336 prepare a locking circuit for dial relay 320. Contacts 337—339 are not used at present.

When metallic connect relay 530 releases contacts 532, the circuit through relay 210 and the filament of lamp L22 is opened. The buzzer is silenced and incoming lamp L22 goes out. Busy lamp L21 remains lit and supervisory lamp L23 continues to glow dimly thus indicating that the call has been answered by the attendant but has not yet been extended to a subscriber.

A circuit is now completed for operating calling bridge relay 610. This relay furnishes talking battery and repeats digit pulses. The circuit for operating this relay extends from ground (+) through the upper winding of relay 610, rest contacts 413, 431, conductor T3, operated contact 333 on answer relay 330, rest contacts 326, conductor T2, the attendant's telephone circuit, conductor R2, contacts K23, K22, conductor R2, contacts 329, operated contacts 334, conductor R3, rest contacts 436, 416, and the lower winding of calling bridge relay 610 to (—) battery. Calling bridge relay 610 closes contacts 612 thereby operating release delay relay 620. Contacts 613 close part of the talking circuit.

When relay 620 operates, contacts 621 open to release busy relay 450. Relay 450 opens contacts 451; however, as will be explained presently, switch-through relay 460 does not release. Contacts 623 close to prepare a circuit for shunt relay 630; however, it does not operate at this time since contacts 611 and 465 are both open. Contacts 624 close to complete a last point in the talking circuit which now extends from conductor R6 through rest contacts 435, operated contacts 624, 613, 436, conductor R3, operated contacts 334, rest contacts 329, conductor R2, contacts K22, K23, conductor R2, the attendant's telephone set, conductor T2, rest contacts 326, operated contacts 333, conductor T3, rest contacts 431, operated contacts 461, rest contacts 433 and conductor T6 to the distant office. Contacts 625 apply ground to sleeve conductor S through the upper winding of relay 310 thus marking the trunk circuit busy to other selector switches that have access over conductors T, R and S. Contacts 626 have no function at this time. Contacts 627 add a multiple ground connection to the busy lamp L21 to keep it from being extinguished and to help maintain the dim glowing of lamp L23.

Signal relay 440 operates over a circuit which may be traced from conductor T6 through rest contacts 433, operated contacts 461, the winding of relay 440, operated contacts 613, 624, and rest contacts 435 to conductor R6. Relay 440 closes contacts 441 to apply ground through contacts 463 and the winding of relay 460 to (-) battery. Relay 460 is slow release so that it does not restore between the time that busy relay 450 opens contacts 451 and relay 440 closes contacts 441.

If the ringing current was applied manually, of course, the operator at position 31 (Fig. 1) determines when to remove it. On the other hand, if the ringing current was applied automatically, the completion of the loop through signal relay 440 just described trips ringing.

*Dialing.*—The attendant determines the destination of the call and proceeds to complete it by means of any suitable equipment. First, she operates key K27 thus completing a circuit from ground (+) through contacts K26, K27, the lower contacts of trunk answer key TA21 and the winding of dial relay 320 to (—) battery. Dial relay 320 operates and closes contacts 321 to hold calling bridge relay 610 in an operated condition after its original circuit is broken. It should be noted that contacts 321 are "X" or preliminary contacts which are adapted to close before other contacts controlled by relay 320 are operated. Shortly thereafter, the original circuit to calling bridge relay 610 is broken at contacts 326 and 329. A dialing circuit is prepared by connecting conductors T2 and R2 to conductors T31 and R31, respectively, at contacts 325 and 328. Conductors T2 and R2 are disconnected from the distant office at contacts 326 and 329. Contacts 329*a* open to break the original path over which answer relay 330 operated. However, this relay has already locked at its contacts 335. Contacts 329*b* close to complete a locking circuit for dial relay 320. This circuit may be traced from (—) battery through the winding of relay 320, operated contacts 329*b* and 336 to round (+). Contacts 329*c* close to complete a circuit for operating release relay 510. This circuit may be traced from ground (+) through release key K28, operated contacts 329*c* and the lower winding of relay 510 to (—) battery.

Release relay 510 closes its "X" or preliminary contacts 415 to complete a loop for holding calling bridge relay 610 in an operated condition. Relay 610 will continue to hold over this circuit until released manually at the end of the call. Contacts 412 complete a circuit around thermistor TH41 to avoid undue wear at this point.

Supervision relay 350 is connected at contacts 414 and 417 to tip and ring conductors, respectively. However, relay 350 is differentially energized at this time and does not operate. Contacts 512 close to prepare a circuit for lighting supervisory lamp L23 brightly when the called subscriber answers. Contacts 514 and 515 close to complete another circuit for the talking conductors which extends from the distant office to line circuit 23 via conductors T5 and R5. Contacts 516 close to prepare a locking circuit for release relay 510. This locking circuit will be effective after answer relay 330 and dial relay 320 have restored.

The attendant proceeds to dial a suitable number of digit pulses into line circuit 23. Line finder 24 and connector 25 (Fig. 1) cooperate to seize the called local subscriber E.

The attendant restores her keys to normal. Responsive to release of key TA21, answer relay 330 restores first since it holds dial relay 320 operated at its contacts 336. When answer relay 330 restores, it closes contacts 339 thereby preparing a locking path for release relay 510. Contacts 333 and 334 open to break the connection of the talking conductors between the attendant's cabinet and the distant office. Contacts 331 prepare a circuit for sleeve relay 310. Dial relay 320 restores when contacts 336 open. Contacts 329*c* open and 329*d* close thereby extending a holding ground over a locking circuit for release relay 510. This circuit may be traced from (—) battery through the lower winding of relay 510, released contacts 329*d*, operated contacts 516, released contacts 339 and release key contacts K28 to ground (+). The talking conductors are connected to line circuit 23 when contacts 324 and 327 close. Contacts 323 close and supervisory lamp L23 lights brightly if the called subscriber has not then answered—the circuit being from ground (+) through contacts 512, 352, 323 and the filament of lamp L23 to (—) battery.

*Answer.*—When the called subscriber answers, the direction of battery flow over conductors T31 and R31 is reversed by any suitable equipment (not shown) thereby causing supervision relay 350 to operate. The circuit extends from conductor T31 through contacts 324, 514, conductor T5, contacts 414, the upper winding of relay 350, retard coil 340, contacts 417, conductor R5, contacts 515, 327 and conductor R31. Contacts 351 close to operate sleeve relay 310 over the circuit extending from (—) battery through the lower winding of relay 310, contacts 351, 331, 561 and 626 in parallel, and contacts 522 to ground (+). Contacts 352 and 316 open to extinguish supervision lamp L23 thereby informing the operator of the fact that the called party has answered. It should be noted that only busy lamp L21 is lit when the call is answered by the called subscriber.

*Flash recall*

The attendant may be recalled before release either by the called subscriber or by the distant operator.

Assuming that the called subscriber recalls by jiggling his hook-switch, equipment (not shown) operates to reverse the direction of battery flow through line circuit 23 and over conductors T31, R31, T5 and R5 to supervision relay 350. Relay 350 releases and reoperates responsive to each jiggle. Note that sleeve relay 310 is locked in an operated condition at this time from (—) battery through the lower winding of relay 310, contacts 312, 331, 561 and 626 on the switchthrough and release relays to ground (+) on contacts 522. Each time that relay 350 releases, contacts 352 close to light supervisory lamp L23 brightly over the circuit from ground (+) through contacts 512, 352 and 323. Also responsive to the closing of contacts 352, incoming lamp L22 lights and the buzzer sounds. The circuit extends over contacts 512, 352, 323, 315, the winding of relay 210 and the filament of lamp L22. Each time that relay 350 reoperates, contacts 352 open to extinguish these lamps and silence the buzzer. Busy lamp L21 is lit steadily from ground on contacts 562 and 627.

Assume that the operator in the distant office wants to recall the attendant. She does so by operating her ringing key. Each time that she applies ringing current, relay 420 operates. Each time that she removes ringing current, relay 420 releases. When relay 420 operates the first time, contacts 522 open to release sleeve relay 310—it had been holding over a circuit which includes contacts 312, 331, 561 and 626 in parallel, and contacts 522. With relay 310 released, contacts 315 open and 316 close. Each time that ringing relay 420 operates, contacts 521 close and metallic connect relay 530 operates. Responsive thereto, contacts 532 close. Incoming lamp L22 lights and the buzzer sounds on completion of the circuit from (—) battery through the filament of lamp L22, the winding of relay 210, contacts 532 and contacts 314 to ground (+). Lamp L23 also lights—but this time dimly and not flashing. The circuit extends from (—) battery through the filament of lamp L23, contacts 316, resistor R24, key contacts NSK3, contacts 562 and 627 in parallel to ground (+). Busy lamp L21 continues to burn continuously.

Thus, means is provided for distinguishing between attendant recall from a local subscriber and a distant operator. That is, on local calls both a bright supervisory lamp L23 and incoming lamp L22 are flashing and the buzzer is sounding in synchronism with the flashing. On operator recall, a dim supervisory lamp L23 is glowing continuously while incoming lamp L22 and the buzzer are following the flashes.

*Release*

After the call is completed, the called subscriber hangs-up thereby returning the battery feed over conductors T31 and R31 to the normal direction of flow for indicating an idle line. This causes supervision relay 350 to restore. Contacts 352 close thereby lighting supervision lamp L23 brightly over the circuit from ground (+) and including contacts 512, 352, 323 and the filament of lamp L23 to (—) battery. Incoming lamp L22 is also lit over the circuit from (—) battery through its filament, the winding of relay 210, contacts 315, 323, 352 and 512 to ground (+). All three lamps are lit brightly now. The attendant can distinguish between disconnect and an incoming call by whether lamp L23 glows brightly or dimly. The attendant responds by opening release key K28 thus restoring release relay 510. Contacts 415 open thus restoring calling bridge relay 610. Release delay relay 620 restores when contacts 612 open. Contacts 613 and 624 are now standing open; hence, the circuit to signal relay 440 is broken so that it must release. Contacts 441 open and switchthrough relay 460 releases. It had been holding through its own locking contacts 463. Sleeve relay 310 restores after both switch-through relay 460 and release delay relay 620 have released to open their contacts 561 and 626. The circuit has returned to normal and all relays are now released.

*Night service*

Figure 2:
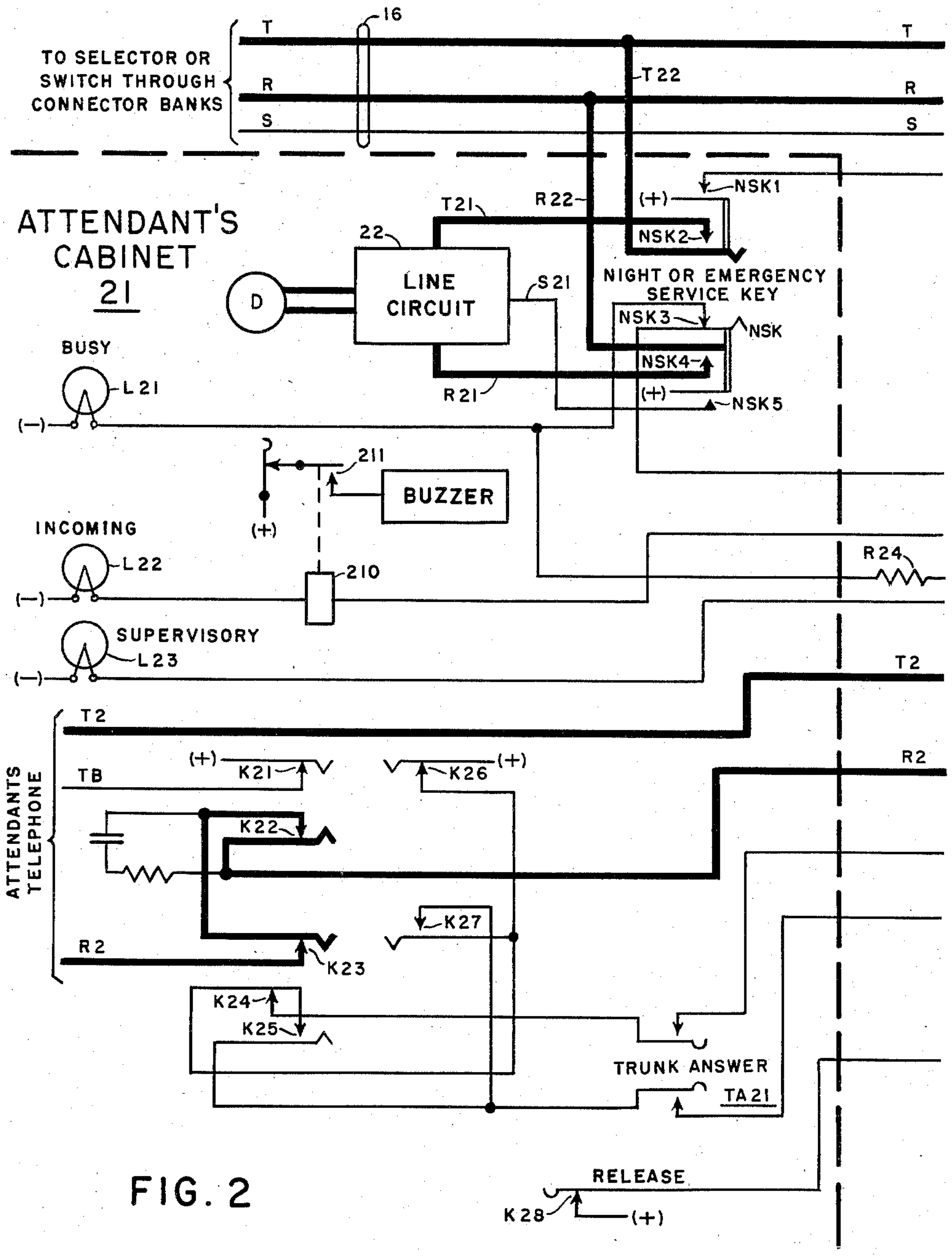
Fig. 2 shows part of an attendant's cabinet.

When the operator at the attendant's cabinet leaves for the night, she throws the night service key NSK (Fig. 2). This connects subscriber D to trunk line 30 over talking conductors T22 and R22 via contacts NSK2 and NSK4. Contacts NSK5 close to apply ground (+) to sleeve conductor S21 thereby marking line circuit 22 busy to all connector switches.

To place a call, the operator at the distant office completes a loop (not shown) across conductors T6 and R6 by any suitable means. Responsive thereto, busy relay 450 operates over a circuit including conductor T6, contacts 621, the winding of relay 450 and resistor R61 to conductor R6. Contacts 451 close to operate switchthrough relay 460, all in the manner explained previously in connection with the foregoing call. However, this time busy lamp L21 does not light when contacts 562 close since its circuit is now open at night service key contacts NSK3.

When ringing current is received, relay 420 operates over a circuit which may be traced from conductor T6 through thermistor TH41, the winding of ringing relay 420 and rest contacts 633 to conductor R6. Responsive thereto, contacts 521 close to operate relay 530. It locks at its contacts 531 through contacts 551, 332 and 313 to ground (+). Relay 530 closes its contacts 432 and 437 thereby completing a metallic circuit for ringing subscriber's station D. This ringing current is extended over the circuit which may be traced from conductor T6 through contacts 432, conductor T22, night service key contacts NSK2, conductor T21, line circuit 22, subscriber station D, line circuit 22, conductor R21, night service key contacts NSK4, conductor R22, contacts 437, 633 and conductor R6 to the distant office.

The subscriber at station D responds to the ringing current by removing his receiver. This completes a loop across the tip and ring conductors which are marked by heavy ink. When the loop is so completed, equipment (not shown) in the distant office functions to remove ringing current.

A circuit is now completed for transmitting talking battery from the distant office to subscriber D. This circuit may be traced from (—) battery (not shown) in the distant office over conductor R6, contacts 633, 437, conductor R22, night service key contacts NSK4, ring conductor R21, line circuit 22, subscriber station D, line circuit 22, tip conductor T21, night service key contacts NSK2, tip conductor T22, operated contacts 432 and conductor T6 to ground (+) at the distant office. It should be noted that the winding of busy relay 450 and the value of resistor R61 are sufficiently high so that the impedance across conductors T6 and R6 is negligible.

After the call is completed, the operator at the distant exchange breaks the connection by any suitable means. Responsive thereto, busy relay 450 restores as does switchthrough relay 460. The circuit is now returned to normal and prepared for the next call.

*Outgoing call*

An outgoing call is the same whether it is placed through switch banks and conductors 16 or from the night service subscriber station D. This call will be described as if it originated at subscriber station D.

*Seizure.*—The subscriber initiates the call by removing his receiver. Responsive thereto, a loop is completed across conductors T21 and R21. Completion of this loop is effective for operating calling bridge relay 610, the circuit being traced from (—) battery through the lower winding of relay 610, rest contacts 416, 436, conductor R22, night service key contacts NSK4, conductor R21, line circuit 22, subscriber station D, line circuit 22, tip conductor T21, night service key contacts NSK2, tip conductor T22, rest contacts 431, 413, and the upper winding of calling bridge relay 610 to ground (+). The purpose of this relay is to seize the trunk circuit, to respond to and repeat digit pulses.

Relay 610 operates and closes contacts 612 thereby operating release delay relay 620 over an obvious circuit. Contacts 613 close to prepare for digit pulsing.

Release delay relay 620 is utilized to control the release of the trunk circuit and to hold it throughout digit pulsing. Contacts 622 close to prepare switchthrough relay 460. There is no ground (+) applied to conductor T6 at this time since trunk 30 is marked idle in the distant office. Contacts 624 close to prepare part of the pulsing circuit. Contacts 625 close to apply ground (+) through the upper winding of sleeve relay 310 to mark conductor S as busy; however this ground is not required during night service operation because key contacts NSK1 are then closed.

At this point it might be well to distinguish between a call from night service subscriber D and a call through the switch banks. Sleeve relay 310 does not operate during a night service call, but would operate at this time during other outgoing calls which may be extended over conductors 16. Sleeve relay 310 performs supervisory functions during those calls. Contacts 626 also help to control sleeve relay 310 and are not important during this night service call. Contacts 627 close. If the night service key were not now operated, busy lamp L21 would light; however, this circuit is broken at contacts NSK3.

When release delay relay 620 closes its contacts 623, shunt relay 630 operates, the circuit being from ground (+) through contacts 465, 623, and the winding of relay 630 to (—) battery. The reason for operating this relay at this time is to transmit a seizure signal to the distant office. A seizure signal in the case of a combination trunk of the type shown in trunk circuit 20 consists of ground applied to conductor R6. The circuit may be traced from ground (+) at contacts 631 through contacts 462, 632, 613, 624, 435 and conductor R6 to the distant office. Equipment at that office responds to this ground (+) marking and causes a line finder to seize conductors 30. Responsive thereto, ground (+) is extended by equipment (not shown) in the distant office over conductor T6 and through contacts 622, 464, and the winding of relay 460 and (—) battery.

Switchthrough relay 460 operates. It opens its contacts 465 thereby dropping shunt relay 630. This in turn opens contacts 631 and 632, which were part of the path for seizing the distant office. Relay 460 closes its contacts 461 while opening its contacts 462 thereby opening still another point in the ground (+) marking circuit formerly extended as a seizure signal over conductor R6 while closing part of the talking circuit.

A circuit is now completed for operating signal relay 440. This circuit may be traced from (—) battery in the distant office over conductor R6, contacts 435, 624, 613, the winding of signal relay 440, operated contacts 461, rest contacts 433 and conductor T6 to ground (+) in the distant office. Signal relay 440 operates and closes contacts 441 thereby extending ground (+) to switchthrough relay 460 over contacts 463. It should be noted that relay 460 is deenergized during the period of time extending from the operation of relay 460 to the operation of relay 440. However, relay 460 is a slow release relay; therefore, it does not restore during this period.

The call has been placed, talking battery is furnished to subscriber D from relay 610 and equipment in the distant office has been seized. Nothing further happens until the subscriber dials a suitable number of digit pulses for setting equipment in the distant office, i. e., automatic switches 32 (Fig. 1).

*Dialing.*—The digit pulses which are transmitted by subscriber D are in the form of breaks in the loop completed across the tip and ring conductors T21 and R21. These breaks are caused by pulsating contacts in the standard telephone dial. Responsive to each open or break in the loop, calling bridge relay 610 restores. This, in turn, opens contacts 612; however, release delay relay 620 does not restore during digit pulsing due to its slow release characteristics. Contacts 611 close thus completing a circuit for operating shunt relays 630. The circuit for operating this relay may be traced from (—) battery through the winding of relay 630, operated contacts 623, rest contacts 434*a* and 611 to ground (+).

Shunt relay 630 is operated at this time to complete a metallic shunt around signal relay 440 thus removing the inductive reactance of its winding and improving pulsing characteristics. This shunt is completed at contacts 632. Contacts 631 also furnish ground for holding operated switchthrough relay 460 during the time that signal relay 440 is shunted down and contacts 441 are open.

Each digit pulse that causes calling bridge relay 610 to restore is repeated over conductors T6 and R6 at contacts 613. At the end of each digit pulse, relay 610 is reenergized, contacts 613 reclose and the repeated digit pulse ends. Spark protection network SP prevents pitting of contacts 613. Equipment in automatic switch train 32 (Fig. 1) responds and extends the connection to called subscriber F.

Subscriber F answers and automatic switching equipment 32 responds in any well known manner. For example, it could reverse the direction of battery flow over the talking loop. However, this answer supervision is not required in the P. B. X; therefore, trunk circuit 20 does not respond to the answer supervision. That is, signal relay 440 is merely connected across the tip and ring conductors. There may be some momentary release of this relay while the direction of battery flow is being reversed. However, that release, if any, will have no effect since the ground (+) applied at contacts 441 will be reapplied before switchthrough relay 460 may restore due to its slow release characteristics. The call is completed, conversation follows, and nothing further happens until the subscribers hang-up.

*Release.*—When subscriber F in the distant office hangs up, the ground (+) marking applied to conductor T6 is removed thus causing signal relay 440 to release. Contacts 441 open and switchthrough relay 460 releases. It had been holding over its own locking contacts 463 to ground (+) applied at contacts 441. Switchthrough relay 460 restores thereby opening contacts 461 to return the outgoing end of trunk circuit 20 to its idle or released condition.

When calling subscriber D hangs-up, he breaks the loop across conductors T21 and R21. This opens the circuit to calling bridge relay 610. It restores. Contacts 612 open and after a brief interval marked by the delay time of relay 620, it restores. Contacts 622 and 624 open. All equipment is now released and the trunk circuit is restored to normal.

While I have shown and described a single embodiment of my invention, it should be obvious that various modifications may be made without departing from the inventive concepts. Therefore, I intend to include within the scope of the appended claims not only the embodiment shown, but also all modifications that may fall within the true spirit of my invention.

What is claimed is:

1. In a telephone system, a private branch exchange and a distant office interconnected by a trunk line, means for switching said private branch exchange between day service and night or emergency service operation, a plurality of subscriber stations in said private branch exchange, means in said distant office for furnishing ringing current to signal a particular one of said subscriber stations during said night or emergency service operation, means in said private branch exchange for furnishing ringing current to signal any desired one of said subscribers during said day service operation, means connected to said trunk line to be operated responsive to said ringing current furnished by said distant office, means for completing a direct, metallic circuit to said particular station from said distant office over said trunk line responsive to operation of said last named means, and means for extending talking battery from said distant office over said metallic circuit to said particular station during periods of said night service.

2. In a telephone system, a private branch exchange, a night service subscriber station and a trunk circuit in said exchange, a distant office, a trunk line terminating in said trunk circuit and extending between said office and said exchange, a first relay in said trunk circuit connected to said trunk line to respond to ringing current projected over said trunk line from said office, a second relay in said trunk circuit connected to respond to said first relay, means for locking said second relay in an operated position after it operates, means responsive to operation of said second relay for completing a metallic connection between said station and said office over said trunk line whereby said ringing current projected from said distant office is extended to said station, and means for extending talking battery from said distant office over said metallic connection to said station during periods of night or emergency service conversation.

3. In a telephone system, a private branch exchange and a distant office interconnected by a trunk line, an attendant's cabinet in said private branch exchange, means controlled from said attendant's cabinet for switching said private branch exchange between day service and night service or emergency service operation, a plurality of subscriber stations in said private branch exchange, means for extending a direct metallic circuit from said distant office over said trunk line to a particular one of said subscriber stations during said night or emergency service operation, means in said distant office for furnishing signaling current to signal said particular one of said subscriber stations during said night or emergency service operation, means whereby said metallic circuit extending means is operated responsive to receipt of said signaling current furnished by said distant office, and means in said private branch exchange for furnishing signaling current to signal any desired one of said subscriber stations during said day service operation.

4. In a telephone system, a private branch exchange, a distant office, means including at least a trunk circuit in said private branch exchange and a trunk line for interconnecting said private branch exchange and said distant office, an attendant's cabinet in said private branch exchange, means controlled from said attendant's cabinet for switching said private branch exchange between day and night service or emergency service operation, a plurality of subscriber stations in said private branch exchange, means in said trunk circuit for extending a metallic circuit from said distant office over said trunk line to a particular one of said subscriber stations during said night or emergency service operation, means in said distant office for furnishing ringing current to signal said particular one of said subscriber stations during said night or emergency service operation, means whereby said metallic circuit extending means is made effective responsive to receipt of said ringing current furnished by said distant office, and means in said private branch exchange for furnishing ringing current to signal any desired one of said subscriber stations during said day service operation.

References Cited in the file of this patent

UNITED STATES PATENTS

| | | |
|---|---|---|
| 1,700,320 | Larsen | Jan. 29, 1929 |
| 1,842,659 | Crocker | Jan. 26, 1932 |
| 1,881,669 | King et al. | Oct. 11, 1932 |
| 1,882,753 | Bowne | Oct. 18, 1932 |
| 2,184,540 | Wright et al. | Dec. 26, 1939 |
| 2,335,481 | Boswau | Nov. 30, 1943 |
| 2,520,130 | Deakin | Aug. 29, 1950 |